US005882108A

United States Patent [19]

Fraizer

[11] Patent Number: 5,882,108

[45] Date of Patent: Mar. 16, 1999

[54] LIGHTING WITH EMI SHIELDING

[75] Inventor: Robert L. Fraizer, Seymour, Ind.

[73] Assignee: Valeo Sylvania L.L.C., Seymour, Ind.

[21] Appl. No.: 542,109

[22] Filed: Oct. 12, 1995

[51] Int. Cl.[6] .......... B60Q 1/02

[52] U.S. Cl. .......... 362/293; 362/265; 362/310

[58] Field of Search .......... 362/61, 265, 293, 362/509, 510, 83.3; 264/1.7; 427/162; 359/585, 361

[56] References Cited

U.S. PATENT DOCUMENTS

| | | | |
|---|---|---|---|
| 4,835,666 | 5/1989 | Feger et al. | 362/83.3 |
| 5,169,224 | 12/1992 | Segoshi et al. | 362/293 |
| 5,255,163 | 10/1993 | Neumann | 362/293 |
| 5,258,686 | 11/1993 | Segoshi et al. | 362/293 |
| 5,343,370 | 8/1994 | Ohashi et al. | 362/265 |
| 5,448,461 | 9/1995 | Fast et al. | 362/293 |
| 5,607,228 | 3/1997 | Ozaki et al. | 362/293 |

*Primary Examiner*—Y. Quach
*Attorney, Agent, or Firm*—William E. Meyer

[57] ABSTRACT

An EMI shielding lens for a lamp, e.g., an automotive lamp. The lens includes a transparent, unitary, polymeric lens blank and a thin, heat transferred grid layer including an electrically conductive grid pattern disposed on the lens blank inner or outer surface. The grid pattern may be formed from indium tin oxide or from a conductive, heat transferable, inks or polymer. The grid layer may also include colored or opaque indicia. Linear elements of the grid pattern are spaced apart by less than ½ λ of the EMI to be shielded. Also discloseed is an electromagnetic interference shielded lamp assembly including an electrically conductive housing, a light source within the housing, the EMI shielding lens fixed to the housing, and grounding means. Methods for fabricating the lens and the lamp assembly are also disclosed.

12 Claims, 3 Drawing Sheets

LIGHTING WITH EMI SHIELDING

CROSS-REFERENCE TO RELATED APPLICATIONS

The present application contains subject matter related to U.S. Application Ser. No. 08/542,238 [Attorney's Docket No. 94-1533], commonly assigned and filed concurrently herewith. Application [94-1-533] is incorporated herein by reference.

BACKGROUND OF THE INVENTION

The present invention relates to lighting, and particularly to a lamp, e.g., an automotive lamp having a lens in which a thermally transferred decal provides shielding against radio noise from the light source of the lamp. The invention also relates to the lens and to methods for producing the lens and the lamp assembly.

Automotive lamps generally include a housing having a reflective coating, a light source mounted within the housing, and a lens sealed to the housing rim. The housing may be fabricated from a metal or a rigid polymeric material coated with a metal to provide the required reflective coating, while the lens is generally molded from polycarbonate or acrylic polymers. When the light source, however, emits significant electromagnetic radiation outside the visible frequency, this assembly may further require means to shield nearby electronic devices from the unwanted radiation. The terms "electromagnetic interference" (EMI), "radio frequency interference" (RF), or "radio noise" are most commonly used to describe extraneous radiation that interferes with operation of electronic devices. In an automobile, these devices may include radios, on-board computer controls, and mobile communication devices. Interference from the light source radiation may also cause problems in devices near the automobile or associated with passengers therewithin, e.g., pacemakers, radios, computers, and communication devices. Most EMI problems with these devices are limited to frequencies between 1 KHz and 10 GHz. For convenience, the term EMI is used herein to refer generally to such unwanted radio and audio frequencies.

One type of prior art EMI shielding of automotive lamps combines the conductive properties of the housing or housing metallic coating with a wire mesh screen covering the area enclosed by the lens, both the housing and the screen being electrically grounded. This wire mesh is difficult to work with during product assembly because it is not easily processed by automatic assembly equipment. It also adds potential for failure of the bond sealing the lens to the housing. Further, it is difficult and costly to form such wire mesh screens into the shapes required for non-planar lenses, e.g., those having recurved or other complex lens shapes.

Another type of prior art EMI shielding of a lamp involves an evaporative metal coating on the lens. This is a costly and complex process requiring precise control of the thickness of the coating. The process also results in significant loss of light emitted by the lamp.

Accordingly, it is an object of the present invention to provide an EMI shielding lamp which overcomes the disadvantages of the prior art.

It is another object of the invention to provide an EMI shielding lamp lens which is readily and economically processed and assembled by automatic equipment.

It is yet another object of the invention to provide a lamp lens having an EMI shielding means included as an integral part of the lens.

It is still another object of the invention to provide radio noise shielding on planar andnon-planar lamp lenses, including those having recurved or other complex lens shapes.

Further objects of the invention are to provide straightforward and economical methods for producing a unitary radio noise shielding lamp lens and for producing a lamp assembly having a unitary radio noise shielding lens.

SUMMARY OF THE INVENTION

In accordance with these objectives, I have developed a lens for a lamp having a heat transferred, EMI shielding coating thereon, and a method for fabrication thereof in which an EMI shielding coating is disposed on a lens blank as a heat transfer decal using thermal transfer techniques.

In one aspect, the invention is an electromagnetic interference shielding lens for a lamp, e.g., an automotive lamp. The lens includes a transparent, unitary, polymeric lens blank having an inner surface and an outer surface, and a thin, heat transferred grid layer disposed on the inner or outer surface of the lens blank. The preferred grid layer includes an electrically conductive grid pattern, e.g., one formed from indium tin oxide. Optionally, the grid layer may further include colored or opaque indicia. Also optionally, the lens may include a ground connection to electrically couple the grid layer to ground. The preferred grid pattern includes linear elements spaced apart by less than ½ the wavelength of the electromagnetic radiation to be shielded by the lens.

In another aspect, the invention is an electromagnetic interference shielded lamp assembly, e.g., an automotive lamp assembly. The lamp assembly includes an electrically conductive housing, a light source within the housing, an electromagnetic interference shielding lens fixed to the housing, the housing and the lens together enclosing the light source, and means for electrically coupling the housing and the grid layer to a grounding means such that electromagnetic radiation emitted by the light source may be conducted to ground. The lens includes a transparent, unitary, polymeric lens blank having an inner surface and an outer surface, and a thin, translucent grid layer, e.g., a layer including a conductive grid pattern disposed on the inner or outer surface of the lens blank. The preferred grid pattern includes linear elements spaced apart by less than ½ the wavelength of the electromagnetic radiation to be shielded by the lens.

In other aspects, the invention is a method of fabricating an electromagnetic interference shielding lens for an lamp or a lamp assembly including such a lens. The method involves providing a transparent, unitary, polymeric lens blank having an inner surface and an outer surface, and applying a thin, adherent, translucent, layer by a heat transfer technique from a carrier surface to the inner or outer lens blank surface. The preferred layer includes an electrically conductive grid pattern. The method of fabricating the lamp assembly further involves mounting a light source within an electrically conductive housing so that light from the light source is projected in a preselected direction, and fixing the electromagnetic radiation shielding lens to the housing so that the housing and the lens together enclose the light source, the light from the light source being projected through the lens and the grid layer. Means for electrically coupling the housing and the grid layer to a grounding means are provided so that electromagnetic radiation emitted by the light source may be conducted from the grid layer and the housing to ground.

BRIEF DESCRIPTION OF THE DRAWINGS

For a better understanding of the present invention, together with other objects, advantages, and capabilities thereof, reference is made to the following Description and appended Claims, together with the Drawing in which:

DETAILED DESCRIPTION OF THE PREFERRED EMBODIMENTS

Figure 1:
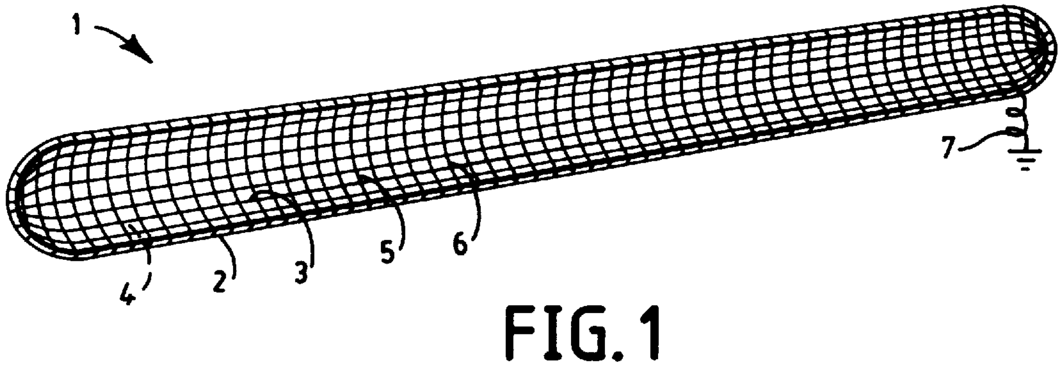
FIG. 1 is an elevation view of a lamp lens for an automotive center high mounted stop lamp (CHMSL) in accordance with one embodiment of the present invention.

An exemplary embodiment of an electromagnetic interference shielding lamp in accordance with the invention is an automotive headlamp including a lens having an electrically conductive grid pattern applied to its inner or outer surface using a thermal transfer techniques. The lens has an EMI shield applied to its surface using a thermally transferred heat transfer decal. The term "heat transfer decal" as generally used in the art means an opaque or transparent printed artwork or other graphic work which has been applied, in reverse, to one side of a carrier film. The "graphic" in this embodiment is a grid pattern in a shape selected to completely or substantially cover a lens blank, as described below. Alternatively, the "graphic" may be a grid pattern completely or substantially covering the carrier film. The decal is then transferred to a substrate lens using thermal transfer techniques described more fully below.

The description herein of various illustrative embodiments shown in the Drawing is not intended to limit the scope of the present invention, but merely to be illustrative and representative thereof.

Referring to FIG. 1, lens 1 for an automotive center high mounted stop lamp (CHMSL) includes unitary lens blank 2 of a transparent polymeric material, for example, a polycarbonate or acrylic material. Lens blank 2 includes inner surface 3 and outer surface 4.

Thin, electrically conductive, heat transfer, grid layer 5 is disposed on lens blank inner surface 3 in the form of electrically conductive grid pattern 6. Alternatively, the heat transfer layer could be applied to outer surface 4 of lens blank 2. Grid pattern 6 may be formed from a transparent, translucent, or opaque, heat transferred, conductive material. The preferred conductive material is a metal, ink, pigment, or polymer, for example indium tin oxide or carbon or metal filled conductive ink or polymer. The grid pattern is made up of electrically interconnected linear elements at a less than ½ λ spacing, that is, spaced apart less than ½ the wavelength of the highest frequency, e.g., 10 GHz., to be suppressed.

The grid may be applied alone, or may be embedded in or printed on a transparent or translucent, clear or colored support layer. One example of such a support layer is the color layer described in above-referenced Application [94-1-533]. A protective, e.g., abrasion resistant coating may be applied over the heat transfer layer to protect the grid. Also alternatively, the EMI shielding may be provided by a thin, uniform coating of a transparent conductive material, e.g., indium tin oxide, applied by heat transfer techniques to the inner or outer surface of the lens blank. Both the heat transfer layer including this conductive coating and that including the conductive grid pattern are referred to herein as grid layers. The preferred embodiment, however, is that having a conductive grid pattern applied to the inside surface of the lens blank. Ground connection 7 is provided in accordance with known techniques to electrically couple grid pattern 6 to ground.

Figure 2:
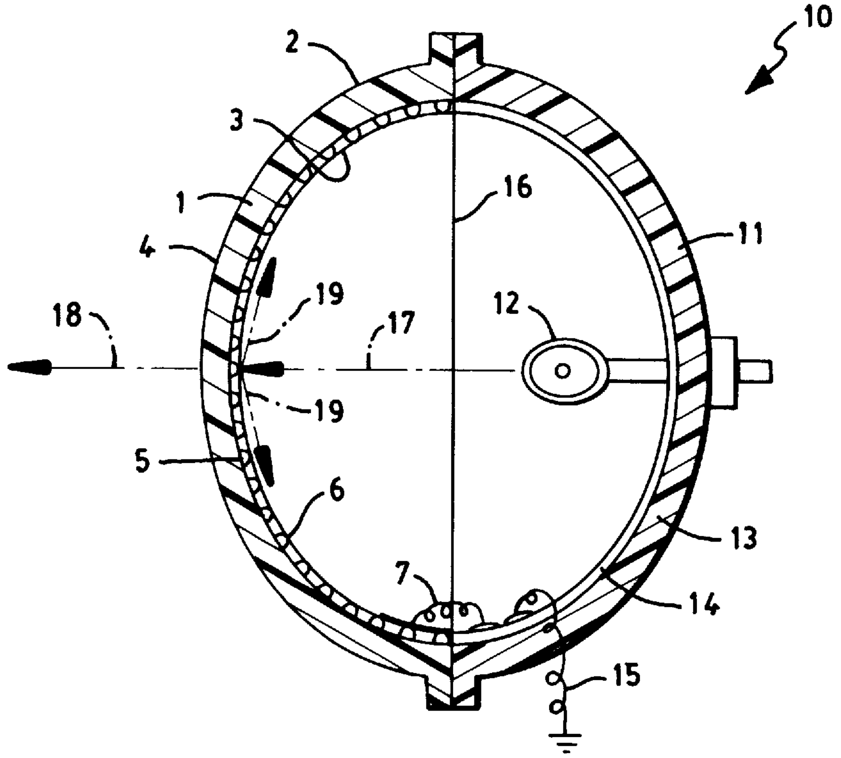
FIG. 2 is a cross-sectional elevation view of a lamp incorporating the lens of FIG. 1, showing the effect of the integral shielding on radio noise emitted by a neon light source.

Referring to FIG. 2, automotive lamp assembly 10 includes housing 11 and light source 12 mounted within the housing. Light source 12 is an emitter of radio noise (EMI), for example a neon or other arc lamp. Lens 1, which is the same as that shown in FIG. 1, is fixed to the housing to enclose light source 12. Housing 11 includes polymeric base 13, e.g., of acrylic, polycarbonate, bulk molding compound (BMC, a glass fiber reinforced, thermosetting, unsaturated polyester resin material including a mold-release compound and filler material), Nylon, or polypropylene. Housing 11 also includes electrically conductive reflective coating 14, e.g., of vapor deposited aluminum over its entire inner surface to reflect light emitted from light source 12. A typical thickness for reflective coating 14 is about 800–1000 Å. Ground connection 15 is provided in accordance with known techniques to electrically couple reflective coating 14 to ground.

Conductive grid 6 of heat transfer layer 5 extends over the entire inner surface of lens blank 2, as shown in FIG. 1, abutting or nearly abutting reflective coating 14 at seal 16. (For the sake of clarity, FIG. 2 shows only the forward edge of grid 6.) Preferably, conductive reflective coating 14 maintains electrical contact with conductive grid 6 at seal 16, by direct contact and/or via a conductive adhesive or other electrically conductive seal structure. Conductive grid 6 forms with reflective coating 14 a conductive enclosure that permits transmission of visible light through lens 1 but shields against transmission of EMI from light source 12 to the exterior of lamp assembly 10. Conveniently, ground connections 7 and 15 may be interconnected and grounded to provide a common path to ground. Alternatively, the electrical communication between conductive grid 6 and reflective coating 14 may be sufficient to permit use of a single ground connection 7 or 15 to provide a path to ground.

When light source 12 is activated, it emits a broad spectrum of radiation, shown schematically in FIG. 2 as arrow 17, including both visible radiation and, possibly, EMI. The visible radiation passes through conductive grid pattern 6, as at arrow 18, with a very low loss of visible light. At the same time, EMI radiation, as at arrows 19, is absorbed by grid pattern 6 to an attenuation level sufficient to minimize interference with nearby electronic devices.

FIGS. 1 and 2 illustrate the preferred embodiment in which a lens covers the lamp assembly and the heat transfer layer is disposed directly on this lens. For certain applications, e.g., large, complexly configured lenses or those with fine lenticules, or where desirable for esthetic or protective purposes, it may be advisable to deposit the heat transfer layer on a second, inner lens and combine this inner lens in a lens assembly with the large, complex, etc. lens as an outer lens. The lens assembly may then be sealed to a lamp housing to enclose a light source, the inner lens providing with the reflective layer the EMI shielding enclosure around the lamp.

Figure 3:
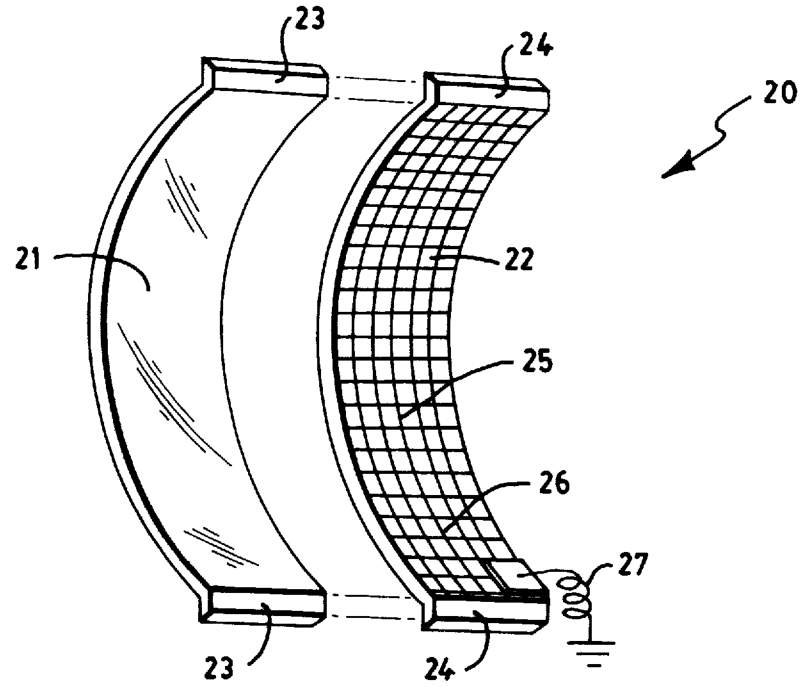
FIG. 3 is an exploded cross-sectional perspective view of a lens assembly in accordance with another embodiment of the invention.

FIG. 3 illustrates such a dual lens embodiment, showing lens assembly 20 in exploded cross-section. Assembly 20 includes thicker, abrasion resistant, outer lens 21 of, for example, a polycarbonate or acrylic material with an outer hardcoat, in accordance with known practice, and thinner inner lens (or interlens or lens insert) 22 of, for example, a polycarbonate, acrylic, or a thermoplastic polymeric material such as Mylar. Conveniently, outer lens 21 is formed of a rigid polymeric material, e.g., polycarbonate, while inner lens 22 may be formed of a more flexible material, e.g., a Mylar film. Lenses 21 and 22 are fitted together at rims 23 and 24, respectively, to form lens assembly 20. Inner lens 22 may conform to the shape of outer lens 21 or, alternatively, may have a shallower curvature, and may contact or nearly contact the body of the outer lens or be spaced therefrom, contacting the outer lens only at rims 23 and 24. Heat transferred grid layer 25 including conductive grid pattern 26, similar to grid pattern 6, is applied to the inner or outer surface of inner lens 22 before mating of the lenses. Ground connection 27 may be used to provide grounding of conductive grid pattern 26.

Figure 4:
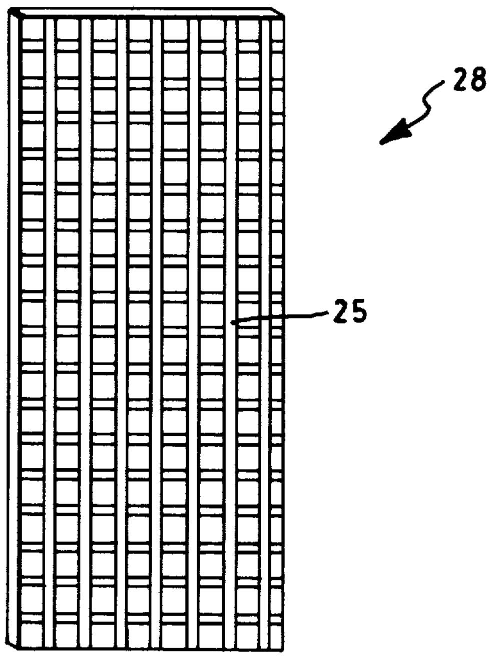
FIG. 4 is a perspective view of yet another embodiment of the invention.

Inner lens 22 may be shaped before the heat transfer layer is applied or, alternatively, the grid may be applied before shaping of a thermoplastic inner lens. FIG. 4 shows planar inner lens blank 28 formed from a thermoplastic material, for example, a Mylar film 2–5 mil thick and heat transferred grid layer 25 applied thereto. The thermoplastic nature of the materials of both lens blank 28 and grid layer 25 permit heat softening of lens blank 28 for shaping of the lens, for example, by vacuum molding to form inner lens 22 as shown in FIG. 3.

Any known heat transfer process may be used to apply the grid layer to the lens blank. However, the heat transfer and shaping processes must be performed in such a way as not to disturb the electrical conductivity of the grid layer. Typical process parameters are a temperature of about 350°–375° C., an application pressure of about 400–450 $lb/in^2$, and a dwell time of about 3–5 seconds.

Figure 5:
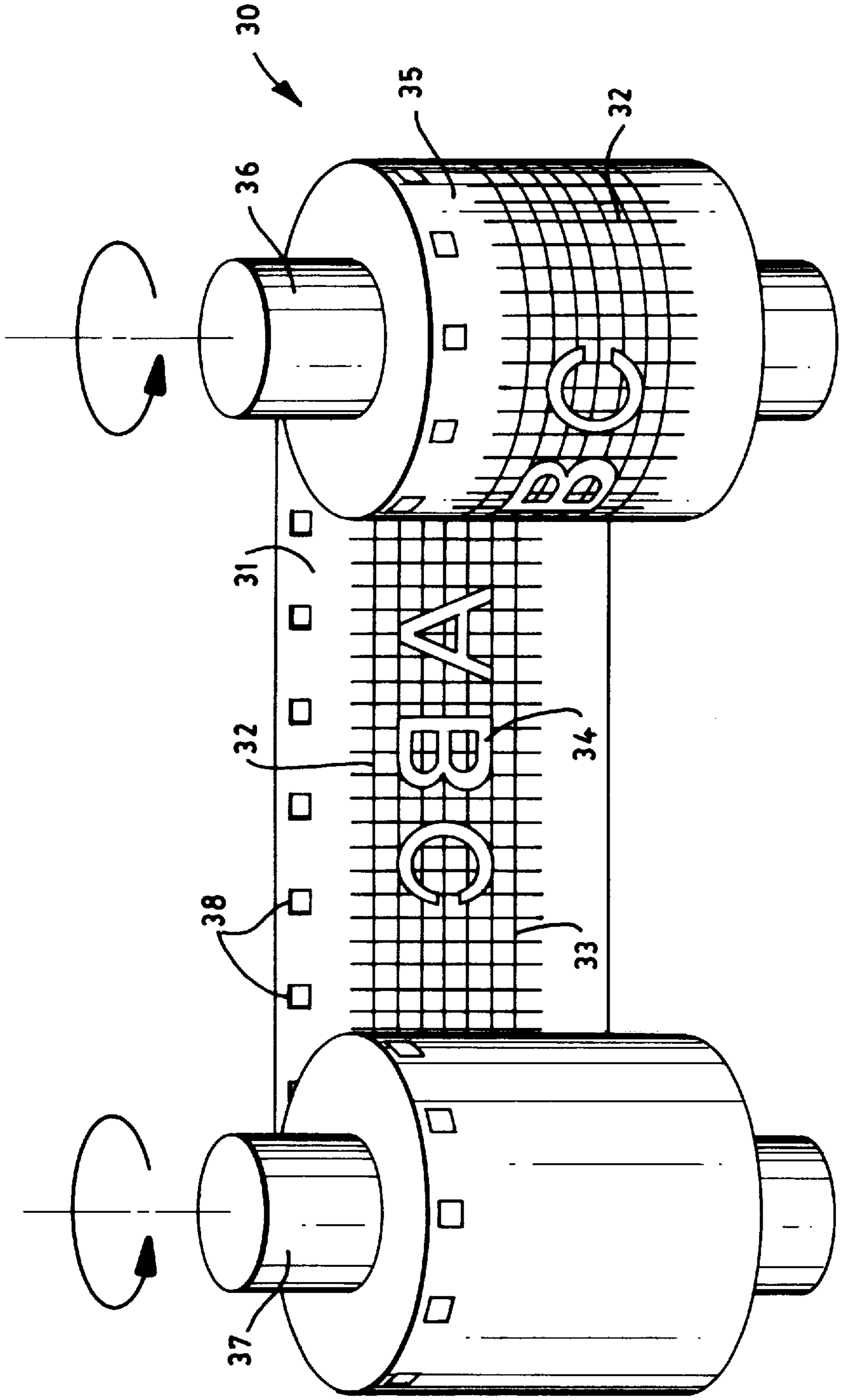
FIG. 5 is a schematic illustration of a portion of a heat transfer apparatus for applying a heat transfer grid layer to the lenses in accordance with certain embodiments of the invention.

FIG. 5 illustrates a typical process and apparatus for the fabrication of the lenses described herein. Heat transfer apparatus 30 includes heat transfer sheet 31, which acts as a carrier film for grid layer 32. Imprinted on grid layer 32 are both grid pattern 33 and optional indicia 34. Grid pattern 33 is formed from a transparent, heat transferable, conductive indium tin oxide material. Alternatively, the grid pattern may be formed from a translucent or opaque material, as described above. Indicia 34 may be formed of a colored translucent or opaque ink or polymer known to be useful for heat transfer decals, and may be conductive, substituting for the grid pattern in the area covered by the indicia.

Heat transfer sheet 31 conveniently may be in the form of flexible sheet roll 35 wound in scroll fashion on a pair of rollers, feed roller 36 and take up roller 37. Sheet roll 35 typically includes a plurality of grid layers 32 imprinted thereon, for successive transfer to a series of lens blanks (not shown). FIG. 5 shows grid pattern 33 as discontinuous on heat transfer sheet 31, forming with indicia 34 the successive grid layers 32. Alternatively, the grid pattern may be a continuous strip along the length of heat transfer sheet 31, or may completely cover heat transfer sheet 31, with optional indicia 34 spaced apart thereon.

Apparatus 30 may be a vertical heat transfer press or a roll-on heat transfer apparatus, both conventional in the heat transfer industry. A conventional heat transfer roll carrier (not shown) positions sheet roll 35 by means of perforations 38 in one or both of its margins to index an area of heat transfer sheet 31 in register with a single lens blank, e.g., lens blank 2 of FIG. 1, mounted at a transfer station (not shown). Typically, the lens blank is supported during the heat transfer process by a concave holding fixture (not shown). The holding fixture is designed to position the lens blank to locate it exactly in the proper plane and to allow no movement of the blank during the transfer operation. The carrier positions sheet roll 35 with grid 33 and/or indicia 34 indexed over the lens blank. An electric eye or mechanical stop determines the position of heat transfer layer 32 and stops the linear motion. At the transfer station of a vertical press heat transfer apparatus, a heated die (not shown), e.g., of silicone is lowered to heat and conformally press sheet 31 against the lens blank for a time sufficient for transfer of grid layer 32 to the lens blank, with grid layer 32 conforming to and bonding to the lens blank.

Alternatively, the lens blank may be lifted upward and pressed against the heated die by the holding fixture. Also alternatively, a roll-on type of heat transfer apparatus may be used. A heated roller, e.g., of silicone is placed over the portion of heat transfer sheet 31 carrying grid 33 with, if present, indicia 34, and is rolled slowly over the sheet surface to transfer grid layer 32 to the lens blank. The combination of heat and pressure softens grid layer 32 to provide good adherence to the lens blank without the use of additional adhesives at the grid layer-lens blank interface. On lifting of the heated die or heater roller from heat transfer layer 32, the bond between the grid layer and the lens blank is now greater than the adhesion of the grid layer to heat transfer sheet 31, and the heat transfer sheet separates from the grid layer leaving the grid and, if present, the indicia bonded to the lens blank. The lens blank is then removed from the holding fixture and replaced with a new lens blank for heat transfer of another grid layer which is being indexed forward.

The EMI shielding lenses may be fabricated in advance of or during final lamp assembly. In either case, the grid pattern permits rapid and accurate assembly of an EMI shielded lamp. A transparent, unitary, polymeric lens blank is formed, e.g., by molding of a transparent polymeric material. The grid layer is applied to the inner or outer lens surface, as described above. A light source is mounted within an electrically conductive housing such that its light is projected toward the area to be covered by the lens. The radio noise shielding lens is then fixed to the housing so that the housing and lens together enclose the light source, providing an EMI shield. The conductive housing and the grid layer are grounded as described above. The visible light is projected through the lens and the grid layer, while the unwanted frequencies are absorbed by the grounded grid layer and housing. A separate heat transfer process may be used to transfer a conductive reflective coating from a carrier film to a housing blank to provide the conductive housing for the lamp assembly. Such a process is described in above-referenced Application [94-1-533].

The invention described herein presents to the art novel, improved lenses for lamp assemblies, e.g., automotive lamp assemblies providing EMI shielding means as an integral part of the lens. The lenses have an integral, electrically conductive grid pattern disposed on a transparent polymeric lens blank to provide shielding against radio noise transmission. The invention also presents a method for producing a unitary radio noise shielding lamp lens and lamp assembly that is less complex and less costly than prior art methods, and avoids the problem of bonding failures common with wire mesh EMI shields.

While there has been shown and described what are at present considered the preferred embodiments of the invention, it will be apparent to those skilled in the art that modifications and changes can be made therein without departing from the scope of the present invention as defined by the appended claims.

I claim:

1. An electromagnetic interference shielded lamp assembly comprising:

an electrically conductive housing;

a light source within said housing;

an electromagnetic interference shielding lens fixed to said housing, said housing and said lens together enclosing said light source, said lens comprising:

(a) a transparent, unitary, polymeric lens blank having an inner surface and an outer surface, and (b) a thin, translucent, electrically conductive grid layer held on a light transmissive support layer and conforming and bonded to a selected one of said lens blank inner and outer surface; and an electrical coupling for electrically coupling said housing and said grid layer to a ground for shielding electromagnetic interference radiation emitted by said light source.

2. A lamp assembly in accordance with claim 1 wherein said grid layer is formed from indium tin oxide.

3. A lamp assembly in accordance with claim 1 wherein said grid layer includes a conductive grid pattern.

4. A lamp assembly in accordance with claim 3, wherein said grid layer includes linear elements spaced apart by less than ½ the wavelength of the electromagnetic radiation to be shield by the lens.

5. A lamp assembly in accordance with claim 1 wherein said lamp assembly is an automotive lamp assembly.

6. An electromagnetic interference shielded lamp assembly comprising:

an electrically conductive housing;

a light source within said housing;

an electromagnetic interference shielding lens fixed to said housing, said housing and said lens together enclosing said light source, said lens comprising:

(a) a transparent, unitary, polymeric lens blank having an inner surface and an outer surface, and (b) a thin, translucent, electrically conductive grid layer conforming and bonded to a selected one of said lens blank inner and outer surface; and an electrical coupling for electrically coupling said housing and said grid layer to a ground for shielding electromagnetic interference radiation emitted by said light source, said grid layer is formed from a material selected from a group consisting of conductive, heat transferable, inks and polymers.

7. A method of fabricating an electromagnetic interference shielding lens for a lamp, said method comprising the steps of:

providing a transparent, unitary, polymeric lens blank having an inner surface and an outer surface, pressing a thin, adherent, translucent, electrically conductive grid layer on a light transmissive support layer the grid and support layer being held on a carrier surface, against a selected one of said lens blank inner and outer surfaces, while applying heat to bond said grid and support layer to said selected on of said lens blank surfaces.

8. A method in accordance with claim 7 wherein said grid layer includes an electrically conductive grid pattern.

9. A method in accordance with claim 7 wherein said lamp is an automotive lamp.

10. A method of fabricating an electromagnetic interference shielded lamp assembly, said method comprising the steps of:

providing a transparent, unitary, polymeric lens blank having an inner surface and an outer surface;

pressing while in a heated state a thin, adherent, translucent, electrically conductive grid layer held on a light transmissive support layer, the grid layer and support layer held on a carrier surface, to a selected one of said lens blank inner and outer surfaces to thereby conform and bond said grid layer to said lens blank surface to form an electromagnetic interference shielding lens;

mounting a light source within an electrically conductive housing such that light from said light source is projected in a preselected direction; and fixing said electromagnetic radiation shielding lens to said housing such that said housing and said lens together enclose said light source, the light from said light source being protected through said lens and said grid layer;

electrically coupling said housing and said grid layer to a ground for shielding electromagnetic interference radiation emitted by said light source.

11. A method in accordance with claim 10 wherein said grid layer includes an electrically conductive grid pattern.

12. A method in accordance with claim 10 wherein said lamp assembly is an automotive lamp assembly.

* * * * *